April 28, 1970     A. L. JENNY ETAL     3,509,425

ELECTROLYTIC CAPACITOR AND ELECTROLYTE MATERIAL THEREFOR

Filed Jan. 10, 1968

Inventors:
Alfred L. Jenny,
James H. Curtis,
BY James J. Lichiello
HIS ATTORNEY.

United States Patent Office 3,509,425
Patented Apr. 28, 1970

3,509,425
ELECTROLYTIC CAPACITOR AND ELECTROLYTE MATERIAL THEREFOR
Alfred L. Jenny, Columbia, S.C., and James H. Curtis, Newark, N.J., assignors to General Electric Company, a corporation of New York
Filed Jan. 10, 1968, Ser. No. 696,896
Int. Cl. H01g 9/00
U.S. Cl. 317—230       12 Claims

ABSTRACT OF THE DISCLOSURE

A substantially non-aqueous liquid electrolyte for electrolytic capacitors consisting of a major proportion of ethylene glycol, a minor proportion of an ionogen, preferably ammonium pentaborate, and a small but effective amount of a copolymer of maleic anhydride and methyl vinyl ether, is characterized by a high breakdown voltage and a high viscosity. The concentration of the copolymer is preferably 0.2–0.6% by weight.

BACKGROUND OF THE INVENTION

Field of the Invention

The present invention relates to electrolytic capacitors, and more particularly to an improved electrolyte therefor.

Description of the Prior Art

Electrolytic capacitors utilizing an electrolyte consisting predominantly of ethylene glycol and an ionogene are well known and in common usage. In order to make these capacitors more effective it has been found desirable to increase the breakdown or scintillation voltage thereof, and to increase the viscosity of the electrolyte. This has been heretofore accomplished, for example, by the addition of mannitol, a polyhydric alcohol having the formula $CH_2OH(CHOH)_4CH_2OH$, to the electrolyte. However, mannitol has several disadvantages which detract from its effectiveness as an additive. A primary disadvantage is the requirement of a considerable quantity of this material to increase the breakdown voltage of the electrolyte and to significantly affect its viscosity. The addition of such large quantities increases the resistivity of the electrolyte and results in a degradation of the electrical properties, for example the dissipation factor, of the capacitors.

SUMMARY OF THE INVENTION

It is, therefore, an object of the present invention to provide an improved electrolyte having a substantially increased viscosity and breakdown voltage while at the same time exhibiting relatively low resistivity.

It is another object of this invention to provide an improved electrolyte containing an additive, wherein the additive minimizes a degradation in the electrical properties of the electrolyte.

It is still a further object of this invention to provide an improved electrolytic capacitor including a predominantly ethylene glycol electrolyte which includes small amounts of a copolymer additive to increase the breakdown voltage thereof while not adversely affecting the electrical characteristics of the capacitor.

Other objects and advantages will become apparent from the following description and appended claims.

In accordance with the objects of this invention, a substantially nonaqueous, liquid electrolyte capacitors is provided which comprises a major proportion of ethylene glycol, a minor proportion of an ionogen, and a small but measurably effective amount of a copolymer of maleic anhydride and methyl vinyl ether. The copolymer may be present in various concentration from about 0.1% by weight up to the limit of solubility of the copolymer in ethylene glycol. A preferred concentration is from about 0.2 to 0.6% by weight. An embodiment of the present invention comprises an electrolytic capacitor including the ethylene glycol electrolyte containing the copolymeric additive.

BRIEF DESCRIPTION OF THE DRAWINGS

The invention will be better understood from the following description taken in conjunction with the accompanying drawings.

DESCRIPTION OF THE PREFERRED EMBODIMENTS

Figure 1:
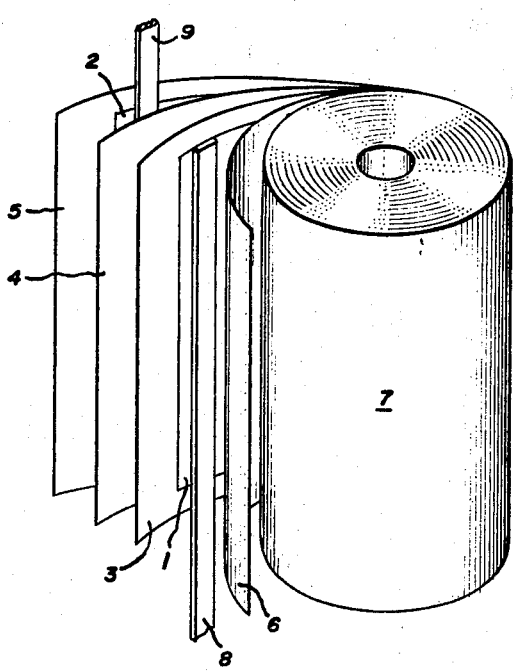
FIGURE 1 illustrates a wound electrolytic capacitor section to which the present invention is applicable.

Referring now to the drawings, and in particular to FIGURE 1, there is shown a partially unrolled capacitor roll section of conventional construction comprising a pair of electrode foils 1 and 2, at least one of which is made of tantalum, aluminum, or other suitable film-forming metal which may be advantageously, although not necessarily etched, and which has a dielectric oxide film thereon. The foils, in the operation of the capacitor, have opposite polarity. The dielectric oxide film may be produced by film-forming (usually anodizing) processes well known in the electrolytic capacitor art. In a polar type capacitor, only one of the electrode foils (anodes) will have an anodic dielectric oxide film thereon. In a non-polar capacitor, both electrode foils will have such films thereon. Between foils 1 and 2 are one or more sheets of dielectric spacer materials 3, 4, 5, and 6 which may be composed for example, of cellulosic material, including paper made of vegetable fiber, such as Benares hemp, or other suitable material of permeable, porous or impregnatable nature. These sheets are impregnated with the electrolyte of the present invention. Terminals or tap straps 8 or 9 are secured to the respective electrode foils and extend in the same or opposite directions. The electrode foils and dielectric sheets are wound into a compact roll 7 prior to insertion into the casing 10, as shown in FIGURE 2.

Figure 2:
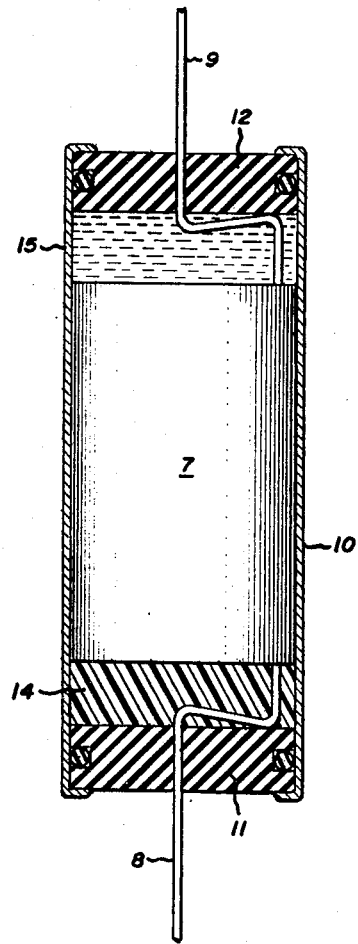
FIGURE 2 illustrates a capacitor assembly with the capacitor section of FIGURE 1 enclosed in a casing.

FIGURE 2 shows the capacitor roll 7 enclosed in a metal casing with terminals 8 and 9 extending respectively through insulating plugs or discs 11 and 12 which seal the interior of the casing in a fluid-tight manner. The roll 7 may be secured or positioned in the casing 10 by a suitable potting compound 14 in the bottom of the casing. The compound 14 may be a resin which is non-reactive with and insoluble in the electrolyte 15 of the present invention. Alternatively, other mechanical techniques well known in the art may be employed to stabilize the position of the roll. Electrolyte 15, as more fully described hereinafter, may fill casing 10.

Other types of electrolytic capacitors may also employ the electrolyte of the present invention. For example, instead of the arrangement shown in FIGURES 1 and 2, wherein the roll is formed by wound cathode and anode foils, the capacitor roll may be constituted by only one electrode foil (anode) having a dielectric film thereon, the cathode being constituted by the outer casing. In such an arrangement, the casing is typically made of silver. Another well known type of capacitor which may employ the electrolyte of the present invention is the wire capacitor, wherein the anode is a film forming wire having a dielectric oxide formed thereon.

The basic electrolyte of the present invention is composed principally of a mixture of a major proportion of ethylene glycol and a minor proportion of an ionogen. The ionogen is preferably ammonium pentaborate but other conducting salts such as ammonium biborate, ammonium acetate, ammonium tartrate or other substituted ammonium salts or their equivalents may also be employed. The proportion of the constituents in the basic electrolyte is preferably about 68% ethylene glycol and about 32% ammonium pentaborate.

It has been found that the addition of a copolymer of maleic anhydride and methyl vinyl ether to the basic electrolyte significantly increases the breakdown voltage and viscosity thereof. The copolymer is commercially available from, for example, General Aniline and Film Company under the name of Gantrez Resin. This resin is available with variable molecular weights but it has been found that the same beneficial results can be obtained with a lesser quantity of a high molecular weight resin as compared with a greater quantity of a lower molecular weight material.

The copolymer is useful when added in concentrations of from a very small but significant amount, about 0.1% by weight, up to the limit of its solubility in ethylene glycol (which is dependent upon temperature and ethylene glycol concentration). A preferred concentration range is from about 0.2–0.6% by weight and a particularly preferred concentration within the range is 0.37%. The upper concentration limit of the copolymer, as a practical matter is primarily determined by the requirement that it replace the air within and thereby impregnate the capacitor roll. At high concentrations of the copolymer the viscosity of the electrolyte at impregnation temperatures is too high to completely impregnate in present commercially acceptable reasonable periods of time. In addition, the inability to effectively replace the air in the capacitor roll resulting from the very high viscosity results in capacitors having a high dissipation factor and a low capacitance.

In the event that the copolymer is relatively insoluble or soluble only with difficulty in the basic electrolyte, as is the case with an ethylene glycol electrolyte, it may be dissolved in a mutually compatible second solvent and then incorporated in the electrolyte to obtain the same effects. Examples of suitable second solvents are dimethyl formamide, n-methyl pyrrolidone, butyrolactone and the like.

The basic electrolyte containing the copolymer is a substantially non-aqueous liquid. The minor amount of water which is present is derived mostly from the water of crystallization of the ionogen. The preferred viscosity of the electrolyte is about 40–50 times less fluid than water. In another secondary embodiment the electrolyte may advantageously be a thermally reversible gel. The composition proportion of the basic electrolyte is not particularly critical and may vary within fairly broad limits. The maximum ethylene glycol concentration is determined by resistivity considerations and should not exceed about 95% by weight of electrolyte. An electrolyte containing more than about 95% by weight would most likely have a resistivity of such high value as to limit its practical usefulness. The lower limit of ethylene glycol composition is determined by the solubility limit of the ionogen in the ethylene glycol at the lowest operating temperature of the capacitor but should not be less than about 50% by weight of the basic electrolyte.

Table I shows the effect of the addition of a small amount of the copolymer of the present invention to a 68% ethylene glycol-32% ammonium pentaborate electrolyte.

TABLE I

| Base Electrolyte | Percent Gantrez #119* added | Breakdown voltage (VDC) | Relative viscosity 25° C. |
| --- | --- | --- | --- |
| Ethylene glycol 68%<br>Ammonium pentaborate 32% | 0<br>0.37 | 300<br>460 | 1<br>5 |

*Gantrez #119 is the lowest molecular weight copolymer available from General Aniline and film.

By comparison, Table II shows the effect of the addition of varying amount of mannitol to the same basic electrolyte.

TABLE II

| Base Electrolyte | Percent Mannitol added | Breakdown voltage (VDC) | Relative viscosity 25° C. |
| --- | --- | --- | --- |
| Ethylene glycol 68%<br>Ammonium Pentaborate 32% | 0<br>3<br>6<br>9 | 300<br>315<br>335<br>360 | 1<br><br><br>5 |

The foregoing tables clearly show that a very small amount of the copolymer produces the same viscosity as 25 times as much mannitol. In addition, the same very small amount of the copolymer causes a substantial increase in the breakdown voltage amounting to an improvement of greater than 50% in the value thereof.

It has also been found that the beneficial effects observed resulting from the addition of very small amounts of the copolymer are not limited to 68% ethylene glycol-32% ionogen electrolytes. For example, the addition of only 0.15% of the copolymer to a 90% ethylene glycol electrolyte increased the breakdown voltage from 235 VDC to 320 VDC, an improvement of better than 35%.

It is nominally to be expected that the addition of a high molecular weight polymer would increase the viscosity of the base electrolyte. However, it would also nominally be expected that an increase in viscosity over a base value would result in a decrease in conductivity since a highly viscous fluid will exert a drag on ions trying to move through it. This should be manifested by a comparable increase in resistivity. We have found, unexpectedly, from a comparison of base electrolytes having the same viscosity, one of which contained mannitol and the other contained the copolymer, that the resistivity of the base electrolyte containing the copolymer is about 1300 ohm-cm. whereas the mannitol containing electrolyte has a resistivity of 1900 ohm-cm. Thus the expected increase in resistivity and attendant degradation of electrical properties does not occur in capacitors containing electrolytes which include the copolymer of the present invention.

The relationship nominally existing between breakdown voltage and resistivity is well known and is expressed according to the equation $$B. D. \text{ Voltage} = \rho a + b$$

where $a$ and $b$ are constants to be determined by the nature of the solvent and solute, and $\rho$ is the resistivity of the solution. Since all constituents except the modifying agent, i.e., mannitol or the copolymer (Gantrez) are the same it would be expected that the lower resistivity electrolyte, i.e., containing the copolymer, would exhibit the lower breakdown voltage. We have found that unexpectedly this is not the result, as shown more clearly in Tables I and II where the breakdown voltage of the electrolyte containing the copolymer is seen to be significantly greater than that of the mannitol electrolyte.

Life tests were conducted on groups of electrolytic capacitors containing the electrolyte of the present invention to demonstrate the electrical characteristics thereof and to show their effectiveness in capacitors rated up to about 500 VDC. The capacitors were constructed of an etched aluminum foil anode (upon which a dielectric oxide film was formed by anodizing), dielectric spacer sheets and a cathode foil. The higher the anodizing voltage applied, the thicker the oxide film formed and the higher the rated voltage of the resulting capacitor. Terminals were applied to demonstrate the electrical characteristics thereof and to dielectric spacer materials were convolutely wound into a capacitor roll. The wound roll was then impregnated with the electrolyte by any well known technique, for example, centrifuging or vacuum impregnation. The roll was then aged, inserted into the casing and the casing was sealed.

The electrolyte used to impregnate the dielectric spacer material was an ethylene glycol-ammonium pentaborate electrolyte containing 0.37% by weight of a copolymer of maleic anhydride and methyl vinyl ether. It was prepared by adding, to a base electrolyte consisting essentially of 68% ethylene glycol and 32% ammonium pentaborate, a solution of the copolymer in butyrolactone. Specifically, the electrolyte was prepared by adding 20 cc. of a solution of 182 grams of Gantrez #119/liter of butyrolactone to 1000 grams of base electrolyte, the resulting electrolyte having a composition, by weight, of about 66.5% ethylene glycol, 31.3% ammonium pentaborate, 0.37% of the copolymer and 1.83% butyrolactone.

Table III shows the electrical characteristics of electrolytic capacitors prepared for life tests and rated at 150 VDC, 200 VDC, 350 VDC and 450 VDC respectively:

TABLE III

| Rated voltage at 85° C. | Cap (μf) | Percent D.F. | Leakage Current (ma. at Rated Voltage) |
| --- | --- | --- | --- |
| 150 | 356 | 9.4 | .029 |
|  | 370 | 10.1 | .016 |
|  | 374 | 9.7 | .022 |
|  | 366 | 9.2 | .020 |
|  | 358 | 11.2 | .019 |
|  | 377 | 8.8 | .022 |
| 200 | 247 | 6.4 | .019 |
|  | 249 | 6.4 | .031 |
|  | 245 | 6.4 | .022 |
|  | 261 | 7.4 | .011 |
|  | 247 | 6.5 | .019 |
|  | 244 | 6.4 | .028 |
| 350 | 145 | 4.3 | .051 |
|  | 146 | 3.2 | .031 |
|  | 145 | 4.3 | .051 |
|  | 143 | 3.3 | .031 |
|  | 133 | 7.1 | .250 |
|  | 132 | 7.1 | .310 |
| 450 | 80 | 4.3 | .260 |
|  | 80 | 4.3 | .480 |
|  | 78 | 3.9 | .760 |
|  | 81 | 4.7 | .480 |
|  | 77 | 3.9 | .750 |
|  | 77 | 6.3 | .500 |

It is clear from Table III that the dissipation factor favors high voltage rated capacitors since it increases with decreasing rated voltage. On the other hand, the capacitance decreases with increased voltage rating. This is due to the increased thickness of the dielectric oxide film on the anode which is necessary to obtain the higher voltage rating. As is to be expected, the leakage current increases with increasing potential difference.

While the present invention has been described with reference to particular embodiments thereof, it will be understood that numerous modifications may be made by those skilled in the art without actually departing from the scope of the invention.

What we claim as new and desire to secure by Letters Patent of the United States is:

1. An electrolyte for electrolytic capacitors comprising a major proportion of ethylene glycol, a minor proportion of an ionogen dissolved therein and a copolymer of maleic anhydride and methyl vinyl ether in said electrolyte, the concentration of said copolymer being from about 0.1 percent by weight up to the solubility limit of said copolymer in ethylene glycol.

2. An electrolyte, as claimed in claim 1, wherein the concentration of said copolymer is from about 0.2–0.6 percent by weight.

3. An electrolyte, as claimed in claim 1, wherein the concentration of said copolymer is about 0.37 percent by weight.

4. An electrolyte, as claimed in claim 3, wherein said ionogen is ammonium pentaborate.

5. An electrolyte, as claimed in claim 1, including a solvent compatible with ethylene glycol and with said copolymer.

6. An electrolyte, as claimed in claim 5 wherein said electrolyte composition, by weight, is:

| | Percent |
| --- | --- |
| Ethylene glycol | 66.5 |
| Ammonium pentaborate | 31.3 |
| Butyrolactone | 1.83 |
| Copolymer of maleic anhydride and methyl vinyl ether | 0.37 |

7. An electrolytic capacitor comprising a pair of electrodes, at least one of said electrodes being composed of a film-forming metal having a dielectric film thereon, and an electrolyte comprising a major proportion of ethylene glycol, a minor proportion of an ionogen dissolved therein and a copolymer of maleic anhydride and methyl vinyl ether in said electrolyte, the concentration of said copolymer in said electrolyte being from about 0.1 percent by weight up to solubility limit of said copolymer in ethylene glycol.

8. An electrolytic capacitor, as claimed in claim 7, wherein the concentration of said copolymer in said electrolyte is from about 0.2–0.6 percent by weight.

9. An electrolytic capacitor, as claimed in claim 7, wherein the concentration of said copolymer in said electrolyte is 0.37 percent by weight.

10. An electrolytic capacitor, as claimed in claim 9, wherein said ionogen is ammonium pentaborate.

11. An electrolytic capacitor, as claimed in claim 7, wherein said electrolyte includes a solvent compatible with ethylene glycol and with said copolymer.

12. An electrolytic capacitor, as claimed in claim 11, wherein said electrolyte composition, by weight, is:

| | Percent |
| --- | --- |
| Ethylene glycol | 66.5 |
| Ammonium pentaborate | 31.3 |
| Butyrolactone | 1.83 |
| Copolymer of maleic anhydride and methyl vinyl ether | 0.37 |

References Cited

UNITED STATES PATENTS

| 2,149,086 | 2/1939 | Craine | 317—230 |
| 2,965,690 | 12/1960 | Petersen et al. | 317—230 |
| 2,994,809 | 8/1961 | Jenny et al. | 317—230 |
| 3,138,746 | 6/1964 | Burger et al. | 317—230 |

JAMES D. KALLAM, Primary Examiner

U.S. Cl. X.R.

252—62.2